Figure 1:
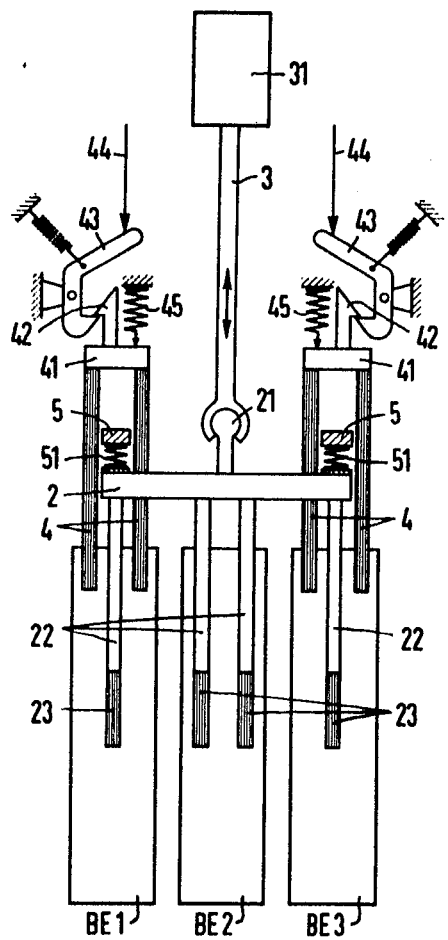

United States Patent

[11] 3,625,816

| [72] | Inventors | Werner Aleite<br>Erlangen;<br>Kurt Bortolazzi, Erlangen-Bruck, both of<br>Germany |
|---|---|---|
| [21] | Appl. No. | 836,842 |
| [22] | Filed | June 26, 1969 |
| [45] | Patented | Dec. 7, 1971 |
| [73] | Assignee | Siemens Aktiengesellschaft<br>Berlin and Munich, Germany |
| [32] | Priority | June 28, 1968 |
| [33] | | Germany |
| [31] | | P 17 64 577.1 |

[54] NUCLEAR REACTOR CONTROL ROD ASSEMBLY
6 Claims, 2 Drawing Figs.

[52] U.S. Cl. .................................................... 176/35,
176/36, 176/86
[51] Int. Cl. ........................................................ G21c 7/08
[50] Field of Search ............................................ 176/35, 36, 86

[56] References Cited
UNITED STATES PATENTS

| 3,297,537 | 1/1967 | Natland ...................... | 176/36 UX |
| 3,519,535 | 7/1970 | French et al. ................. | 176/86 |

*Primary Examiner*—Benjamin R. Padgett
*Assistant Examiner*—Harvey E. Behrend
*Attorneys*—Curt M. Avery, Arthur E. Wilfond, Herbert L. Lerner and Daniel J. Tick ABSTRACT: Control rod assembly for nuclear reactors includes a plurality of finger control rods carried in common by a spiderlike holder, mechanical drive mechanism for displacing the holder vertically to insert the finger control rods into a plurality of fuel elements, the finger control rods containing neutron-absorbing substance along at least part of the length thereof, means for mounting a plurality of neutron-absorbing shutoff rods outside the reactor core, the mounting means being releasable during abnormal operation of the reactor for inserting the shutoff rods into the fuel elements and entrainment means operatively connected to and displaceable with the finger control rod holder and entrainable by the entrainment means in released condition of the mounting means.

PATENTED DEC 7 1971  3,625,816

NUCLEAR REACTOR CONTROL ROD ASSEMBLY

Our invention relates to nuclear reactor control rod assembly and more particularly of the type having a plurality of finger control rods that are insertable into the fuel elements of the reactor core in place of fuel rods, and that is provided with a spiderlike common holder for the finger control rods that is displaceable in vertical direction by a mechanical drive mechanism.

The so-called finger control rods have received their name from the fact that they have a relatively small diameter as compared to conventional control rods.

The nuclear reactor fuel elements contain guide tubes in which an array of fuel rods are disposed, several of the guide tubes located at specific positions being employed for receiving the finger control rods therein. The diameter of the guide tubes for the finger control rods corresponds practically to the diameter of the guide tubes for the fuel rods that are conventionally inserted in the fuel element. This type of control rod arrangement can be employed advantageously for such nuclear reactors that are equipped with a quasi-homogeneous core wherein the individual fuel elements are disposed adjacent one another and without any spacing therebetween, so that all of the fuel rods of the reactor core have the same close spacing to one another. A core structure of this type is found, for example, in a pressurized water reactor.

Since every movement of the control rods effects a specific disturbance in the neutron flux distribution of a nuclear reactor, it is expedient to provide in addition to the function of the bank or array of control rods proper, a number of other control rods which effect a correction of the neutron flux distribution if such correction has not previously been taken into account in the program of the control rod bank. A proposal has already been made in German Pat. No. 1,222,175 which strives in this direction. According to that proposal, several neutron-absorbing bodies are insertable substantially up to the middle of the reactor core so as to correct the flux distribution thereby. Such corrective action is capable of attainment also with control rods that are charged with neutron-absorbing substances only along part of the length thereof, such as the lower end thereof for example, and are known as "partial rods." It is very difficult, however, to install above the reactor core, the large number of drive mechanisms for the normal-length control rods or "whole rods" and for the "partial rods," notice being taken, furthermore, that some of the "whole rods" have the collateral function of shutoff or "scram" rods.

It is accordingly an object of our invention to provide nuclear reactor control rod assembly wherein the shutoff rods, the normal-length control rods and those control rods for correcting the flux density distribution are arranged and constructed in such manner that no difficulties arise with respect to the availability of space above the reactor pressure vessel for the necessary drive mechanisms.

The basic solution for the foregoing objective is to combine shutoff rods proper with other rods as a structural unit.

With the foregoing and other objects in view, we provide, in accordance with our invention, control rod assembly for nuclear reactors having a plurality of fuel elements in the reactor core thereof, comprising a plurality of finger control rods, a spiderlike holder for carrying in common all of the plurality of finger control rods, mechanical drive mechanism for displacing the holder in vertical direction for inserting the finger control rods into a plurality of fuel elements at locations of the latter normally occupied by fuel rods, the finger control rods containing neutron-absorbing substance along at least part of the length thereof, means for mounting a plurality of neutron-absorbing shutoff rods outside the reactor core during normal operation of the reactor, the mounting means being releasable during abnormal operation of the reactor for inserting the shutoff rods into the fuel elements at locations of the latter normally occupied by fuel rods, and entrainment means operatively connected to and displaceable with the holder for the finger control rods, the mounting means being entrainable by the entrainment means in the released condition of the mounting means.

The shutoff rods and the means for mounting the same are maintained in ready or standby position above the reactor core and, in the event of abnormal operation of the reactor, the shutoff rods are dropped into the reactor core by force of gravity and, if necessary, by applying additional spring force thereto. The mechanical drive mechanism for the finger control rods serve for restoring the shutoff rods to their initial ready position above the reactor core. This is possible due to the fact that all of the control rods are dropped down to an end stop thereof into the reactor core whenever shutoff occurs. In order to permit the shutoff rods to drop into the reactor core even if the spiderlike holder of the finger control rods is jammed, the entrainment means connected to the holder for the finger control rods is of such construction that it is effective only during upward travel thereof.

Other features which are considered as characteristic for the invention are set forth in the appended claims.

Although the invention is illustrated and described herein as embodied in nuclear reactor control rod assembly, it is nevertheless not intended to be limited to the details shown, since various modifications and structural changes may be made therein without departing from the spirit of the invention and within the scope and range of equivalents of the claims.

Figure 2:
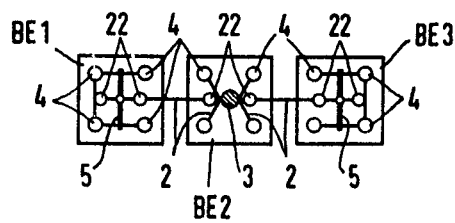

The construction and method of operation of the invention, however, together with additional objects and advantages thereof will be best understood from the following description of specific embodiments when read in connection with the accompanying drawing, in which:

FIG. 1 is a diagrammatic elevational view of an embodiment of the nuclear reactor control rod assembly of our invention, and FIG. 2 is a diagrammatic top plan view, partly in section of a modified form of the embodiment of FIG. 1.

Referring now to the drawing and first, particularly to FIG. 1 thereof, there is shown an assembly according to our invention wherein partial finger control rods and shutoff rods are combined. Thus, finger control rods 22 carried by a common spiderlike holder 2 are received in fuel elements BE 1, BE 2 and BE 3. A coupling element 21, such as a universal joint, connects the holder 2 to a drive shaft 3, which is driven vertically, as represented by the associated double-headed arrow, by a driving mechanism 31, such as a piston and cylinder for example. By displacing this single shaft 3, the finger rods 22, which are provided with a lower portion 23 containing neutron-absorbing substance, are also simultaneously displaced in the same vertical direction into and out of conventional nonillustrated guide tubes provided in the fuel elements BE 1, BE 2 and BE 3. Obviously the fuel elements can be arranged in another array rather than in a straight line as shown in FIG. 1 and, for that matter in FIG. 2. Thus, the fuel elements may be disposed in an array forming a rectangular or a cross or any other suitable configuration. Such a layout is strictly a matter of design and is of little importance with respect to the control rod assembly of our basic invention. In the embodiment of FIG. 1, so-called shutoff or scram rods 4, containing neutron-absorbing material over substantially the entire length thereof, are connected in groups of four as shown in FIG. 2 (only two scram rods 4 of each group being shown in FIG. 1), the scram rods 4 of each group being connected to one another by a bridge 41 from which, in turn, a coupling device 42 extends, and is engaged in a movable latch 43 located outside i.e. above (as viewed in FIG. 1) the reactor core. Each group of four scram or shutoff rods 4 forms a forked structure within the inner space of which a horizontal entraining rod 5, fastened to the spiderlike holder 2 of the finger control rods 22, is inserted. For shock absorption, this entraining rod 5 is provided with a spring system 51. In the event of a shutoff of the reactor, and when the drive mechanism 31 causes or permits the finger control rods 22 to drop into the fuel elements BE 1, BE 2 and BE 3, the shutoff rods 4 also fall into the respective fuel elements by suitable actuation of releasing rods represented by the arrows 44 so that they press against the latching lever 43, thereby releasing the coupling member 42. The shutoff rods 4 then drop under the influence of gravity and, if desired, additionally accelerated by a spring 45, into fuel elements BE 1 and BE 3 until they reach a final position such as, for example, a position wherein the underside of the bridges 41 rest on the entraining rods 5. Moreover, though not illustrated in the figures, suitable conventional shock absorbers are provided in the lower part of the reactor core frame for braking the drop of all the control rods, so that no excessively large braking forces occur. Any suitable number of assemblies corresponding to the assembly of our invention, as shown in FIG. 1, may be employed for a reactor core.

In order to start the reactor up again, limited numbers of the neutron-absorbing shutoff rods 4 are simultaneously withdrawn in succession from the reactor core until coupling member 42 extending from the bridge 41 of the respective numbers of shutoff rods engages in the corresponding latch 43. This can be effected relatively slowly, depending upon the pulling force of the drive mechanism 31, which raises the finger control rod subassembly and, in the course of doing so, causes the entraining members 5 to raise the shutoff rod subassembly. After the latter subassembly has been raised, and the coupling members 42 locked by the latches 43 so that the shutoff rods are now in readied or standby position in anticipation of a subsequent shutoff requirement, the finger control rods or partial rods 22 are then again returned to their lowermost position within the fuel elements. Only when all the shutoff rods 4 are restored in this manner to their starting position in which they are raised above the reactor core, are the conventional nonillustrated control rods slowly withdrawn from the reactor core in accordance with a respective predetermined program in order to start up the reactor. Due to the fact that only a limited number of finger rod assemblies are withdrawn respectively from the reactor core as the shutoff rods 4 are withdrawn therefrom, while the finger rods of other finger rod assemblies remain in the reactor core, a sudden uncontrolled power excursion is safely avoided in this manner.

The modified embodiment of FIG. 2 has much the same construction as that of FIG. 1 except that two finger control rods 22 are insertable in the respective fuel elements BE 1 and BE 3, and an additional shutoff rod assembly is provided for insertion in the fuel element BE 2.

Although it has been mentioned hereinbefore that the finger control rods 22, which have only a part 23 of their length containing neutron-absorbing substance, have been provided for correcting the neutron flux distribution within the reactor core, it is by no means meant to exclude from the scope of our invention that they can also serve simultaneously for adjusting the reactivity of the reactor. This can be effected by providing control rod banks or arrays which are not only made up of whole rods, i.e. rods having neutron-absorbing substance along the entire length thereof, but also including partial rods such as the rods 22 distributed therebetween in a predetermined manner.

The relative position of the partial rods to the remainder of the control rod bank or array is predetermined by the rod control apparatus in proportion to the neutron flux distribution.

We claim:

1. Control rod assembly for nuclear reactors having a plurality of fuel elements in the reactor core thereof, comprising a plurality of finger control rods, a spiderlike holder for carrying in common all of said plurality of finger control rods, mechanical drive mechanism for displacing said holder in vertical direction for inserting said finger control rods into a plurality of fuel elements at locations of the latter normally occupied by fuel rods, said finger control rods containing neutron-absorbing substance along at least part of the length thereof, means for mounting a plurality of neutron-abosrbing shutoff rods outside the reactor core during normal operation of the reactor, said mounting means being releasable during abnormal operation of the reactor for inserting said shutoff rods into the fuel elements at locations of the latter normally occupied by fuel rods and entrainment means operatively connected to and displaceable with the holder for said finger control rods, said mounting means being entrainable by said entrainment means in the released condition of said mounting means.

2. Control rod assembly, according to claim 1, wherein said drive mechanism is actuable for upwardly displacing said finger rod holder and said shutoff rod-mounting means through said entrainment means, and wherein said entrainment means are spring mounted on said finger rod holder, and form a force-locking connection with said shutoff rod-mounting means only when the latter is being upwardly displaced.

3. Control rod assembly according to claim 2, wherein said shutoff rods are connected by a bridge member, respectively, in groups of four shutoff rods defining spaces therebetween wherein said entrainment means are received.

4. Control rod assembly according to claim 1, wherein said shutoff rods are releasable remotely from said mounting means thereof for dropping by force of gravity together with other control rods of the reactor into the reactor core for shutting down the reactor.

5. Control rod assembly according to claim 4, including spring means operatively connected to said shutoff rods for accelerating the dropping of said shutoff rods into the reactor core.

6. Control rod assembly according to claim 3, wherein a plurality of said groups of shutoff rods are assembled in separate units, each of said groups being insertable in a separate fuel element, said spiderlike holder having separate entrainment means for entraining a separate mounting means for a corresponding unit of assembled shutoff rods.

* * * * *